United States Patent
Kumar et al.

(10) Patent No.: US 12,450,750 B2
(45) Date of Patent: Oct. 21, 2025

(54) MODIFYING DIGITAL IMAGES VIA ADAPTIVE RENDERING ORDER OF IMAGE OBJECTS

(71) Applicant: Adobe Inc., San Jose, CA (US)

(72) Inventors: Harish Kumar, Noida (IN); Praveen Kumar Dhanuka, Howrah (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 313 days.

(21) Appl. No.: 18/343,874

(22) Filed: Jun. 29, 2023

(65) Prior Publication Data

US 2025/0005763 A1   Jan. 2, 2025

(51) Int. Cl.
   *G06T 7/12*   (2017.01)
   *G06F 40/109*   (2020.01)
   *G06T 7/13*   (2017.01)

(52) U.S. Cl.
   CPC .............. *G06T 7/12* (2017.01); *G06F 40/109* (2020.01); *G06T 7/13* (2017.01); *G06T 2207/20104* (2013.01)

(58) Field of Classification Search
   None
   See application file for complete search history.

(56) References Cited

U.S. PATENT DOCUMENTS

| | | | | |
|---|---|---|---|---|
| 7,986,331 B1 * | 7/2011 | Meridian | ............ | G06F 3/04847 345/619 |
| 2013/0335452 A1 * | 12/2013 | Suchomel | ............ | G06T 11/203 345/660 |
| 2014/0225977 A1 * | 8/2014 | Vilcovsky | ............ | G06Q 50/00 348/14.07 |
| 2017/0270392 A1 * | 9/2017 | Nakahara | ............ | G06K 15/1809 |
| 2017/0322910 A1 * | 11/2017 | Dhanuka | ............ | G06T 11/60 |
| 2018/0150715 A1 * | 5/2018 | Chang | ............ | G06V 10/82 |
| 2018/0253878 A1 * | 9/2018 | Jain | ............ | G06T 11/203 |

(Continued)

OTHER PUBLICATIONS

Bruneton et al., "Real-Time Rendering and Editing of Vector-based Terrains," Eurographics, vol. 27 (2008), No. 2 (Year: 2008).*

(Continued)

*Primary Examiner* — Soo Shin
(74) *Attorney, Agent, or Firm* — Keller Preece PLLC

(57) ABSTRACT

The present disclosure relates to systems, methods, and non-transitory computer-readable media that generates a modified digital image with a modified rendering order of objects within a digital image. For instance, the disclosed systems generate, in response to an input indicating a selected region of a digital image, an object mask for a first object located at least partially within the selected region of the digital image and further generate a vectorized object mask including a boundary of the first object from the object mask. The disclosed systems determine an overlapping region of the vectorized object mask with the selected region and an additional vectorized object mask. The disclosed systems generate a modified digital image by modifying a rendering order of a portion of the first object corresponding to the selected region and a portion of a second object overlapping the portion of the first object within the selected region.

20 Claims, 10 Drawing Sheets

(56) References Cited

U.S. PATENT DOCUMENTS

2020/0151944 A1* 5/2020 Jain .................... G06F 7/764

OTHER PUBLICATIONS

Runz et al., "MaskFusion: Real-Time Recognition, Tracking and Reconstruction of Multiple Moving Objects," 2018 IEEE International Symposium on Mixed and Augmented Reality (Year: 2018).*
Screen capture from YouTube video clip entitled "Vector mask in photoshop," 1 page, uploaded on Apr. 24, 2020 by user "GFXMentor". Retrieved from Internet: <https://www.youtube.com/channel/UCP3Alk974-PeB9bg1Mc7wug>.
Jun Hao Liew, Scott Cohen, Brian Price, Long Mai, and Jiashi Feng. Deep interactive thin object selection. In Winter Conference on Applications of Computer Vision (WACV), 2021.
James McCann and Nancy Pollard. Local layering. 28(3), Jul. 2009.

* cited by examiner

MODIFYING DIGITAL IMAGES VIA ADAPTIVE RENDERING ORDER OF IMAGE OBJECTS

BACKGROUND

Recent years have seen significant advancement in hardware and software platforms for creating and modifying digital images to produce high-quality and creative digital images. For example, many platforms offer software applications that provide tools to edit objects within a digital image. Many entities utilize these software applications to generate digital images or digital video for a variety of uses and in a variety of contexts. Additionally, many use cases involve mixing text with other objects in digital images to create a variety of effects, such as editing objects within a digital image to give the digital image a three-dimensional appearance. Accurately applying certain effects to objects in digital images, however, can be challenging and time consuming given the expertise often required to utilize the software applications.

SUMMARY

One or more embodiments described herein provide benefits and/or solve one or more of problems in the art with systems, methods, and non-transitory computer-readable media that generates a modified digital image by modifying a rendering order of objects within a digital image. For instance, in one or more embodiments, the disclosed systems automatically modify a rendering order of objects of a digital image within a region selected by a user to apply a three-dimensional layering or twirling effect to the objects. In some embodiments, the disclosed systems generate object masks for objects located at least partially within the selected region. Further, the disclosed systems vectorize the object masks and determine one or more overlapping region of object boundaries within the vectorized object masks and the selected region. The disclosed systems generate a modified digital image by modifying the rendering order of one or more portions of the objects within the selected region according to the overlapping region. Additionally, in some embodiments, the disclosed systems automatically adapt to changes made to one or more object boundaries to maintain realistic, logical ordering of objects for in and around the selected region. The disclosed systems thus provide a tool for flexibly and efficiently modifying object layering/ordering in digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
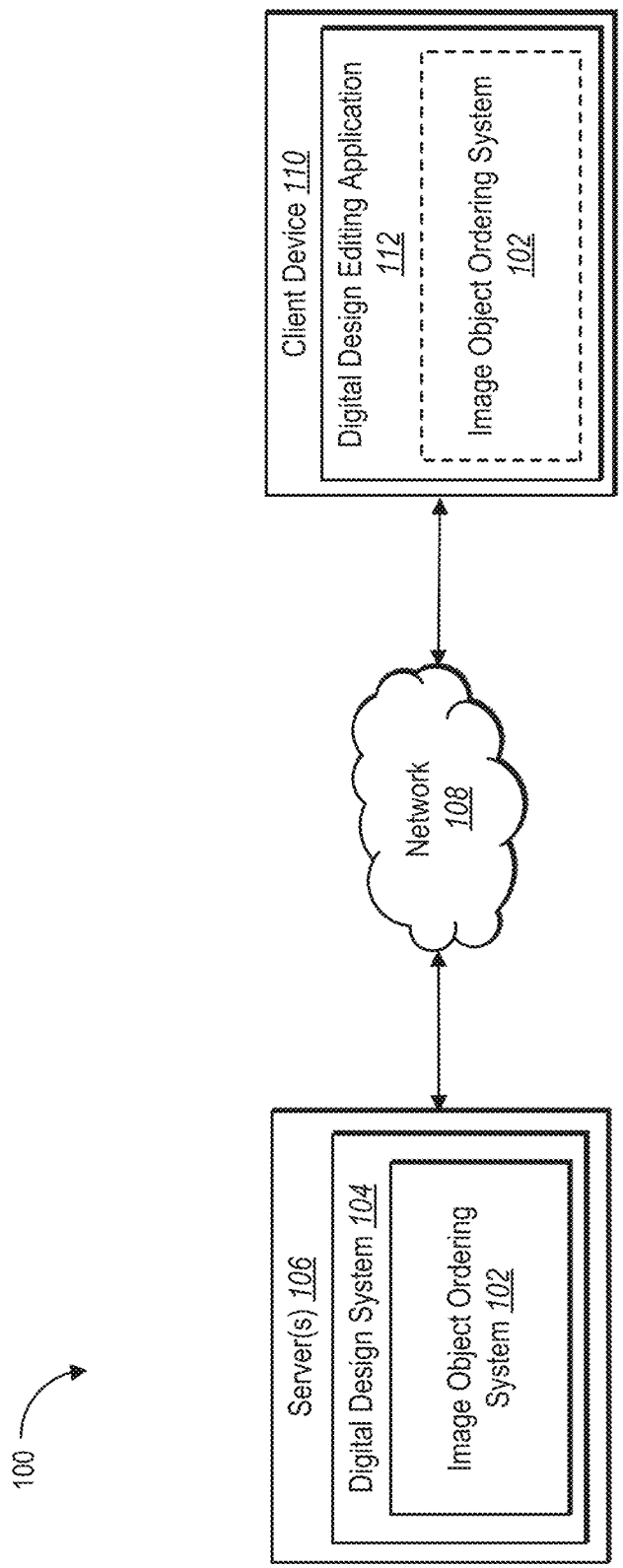
FIG. 1 illustrates an example environment in which an image object ordering system operates in accordance with one or more embodiments.

One or more embodiments described herein include an image object ordering system that generates a modified digital image by modifying a rendering order of portions of objects within a digital image to achieve a three-dimensional layering or twirling (e.g., intertwining) effect for objects in a digital image. Conventional systems have a number of disadvantages with respect to modifying objects in digital images. For example, conventional image editing systems suffer from several technological shortcomings that result in inefficient and inflexible operation. In particular, conventional systems generally require excessive user interactions to generate modified digital images that contain objects with a three-dimensional layering effect. Specifically, conventional image editing systems often provide complex tools to modify portions of objects relative to other objects and/or portions of objects. For instance, some conventional image editing systems provide tools for selecting, erasing, moving, or otherwise editing an object to appear in front of or behind another object via the generation and positioning of multiple layers. Accordingly, modifying portions of highly detailed objects generally requires a high level of skill and experience, along with numerous interactions with a number of different tools (e.g., utilizing object editing tools and image layering tools to select, move, copy, paste, or erase portions of an object) to achieve a three-dimensional layering effect by recreating portions of an object to be behind or in front of another object.

Furthermore, in conventional image editing systems, the adjustment of object properties within a digital image further causes computational inefficiencies. For example, adjusting object properties (e.g., the size or appearance of an object) via conventional image editing systems typically requires the use of a variety of tools to modify previous edit operations to adapt to the object property adjustments. Accordingly, even minor object property adjustments can result in the conventional image editing systems requiring a large number of user interactions and excessive consumption of computational resources to update a three-dimensional layering effect of objects within a digital image. Additionally, the rigidity of conventional systems relying on user expertise with a variety of tools to apply a three-dimensional layering effect generally requires a high level of skill and experience to generate images with a three-dimensional layering effect of objects within the digital image, especially when dealing with certain object types (e.g., text objects) or objects with fine details. Furthermore, some conventional systems provide tools for applying various static layering effects in digital images, but such systems typically handle a digital image including multiple objects as a single object, resulting in illogical ordering of the objects (e.g., by treating a single portion of a text character or object as a foreground object and a background object at the same time). Such conventional systems also fail to adapt to changes made to the objects and require additional inputs to update the ordering of the objects according to the changes.

As mentioned above, in one or more embodiments, the image object ordering system generates a modified digital image to apply a three-dimensional layering or twirling effect by modifying a rendering order of one or more portions of objects of a digital image. For example, the image object ordering system receives an indication of a selected region of the digital image including one or more portions of objects within the digital image. In particular, in one or more embodiments, the image object ordering system generates one or more object masks for one or more objects located at least partially within the selected region. The image object ordering system further generates one or more vectorized object masks including boundaries of the one or more objects via the object mask(s) in connection with the selected region.

Moreover, in one or more embodiments the image object ordering system determines one or more overlapping regions of the boundaries of the vectorized object mask(s) and the selected region to generate a modified digital image. Specifically, in some embodiments the image object ordering system generates the modified digital image by modifying a rendering order of at least one part of a first object and at least one part of a second object that correspond with the selected region within the digital image to create a three-dimensional layering or twirling effect for the first object and the second object. Furthermore, in one or more embodiments, in response to changes to object properties of the objects corresponding to the selected region, the image object ordering system automatically adapts the three-dimensional layering or twirling (e.g., intertwining) effect of affected portions of the first object and the second object.

As mentioned above, the image object ordering system provides several advantages over conventional systems. For example, the image object ordering system can operate more efficiently than conventional image editing systems. For example, in contrast to conventional systems that require the use of a number of different tools to apply certain three-dimensional effects to two-dimensional images, the image object ordering system reduces excessive user interactions by automatically generating a modified digital image utilizing a single tool. For example, by modifying a rendering order of portions of objects corresponding to a selected region, the image object ordering system provides a quick and efficient method of applying a three-dimensional layering or twirling effect to objects within a digital image. In particular, the image object ordering system utilizes an indication of a particular region of a digital image to determine overlapping regions of objects within the particular region and apply the twirling effect according to object boundaries without requiring excessive user interactions. Moreover, the image object ordering system can save time and computational resources by generating the modified digital image in response to only an indication of a selected region without requiring the use of a plurality of complex image editing tools.

In addition, the image object ordering system provides improved flexibility over conventional image editing systems. In particular, in contrast to conventional systems that require individual adjustment/updates to image content to apply broad design changes, the image object ordering system automatically adapts a three-dimensional layering or twirling effect in response to various modifications made to object properties within a digital image. Specifically, by leveraging detection of overlapping object boundaries in connection with a selected region of a digital image, the image object ordering system can retain understanding of the corresponding portions of objects when the object properties change. For example, the image object ordering system provides logical ordering between a foreground object and a background object relative to a selected region even when object boundaries in the selected region change. Accordingly, the image object ordering system can eliminate the need to individually reapply image edits using different editing tools in response to changing various object properties (e.g., changes to text size or style) and improves upon operational flexibility via a single tool. Additionally, the image object ordering system provides options to utilize various adaptability policies to apply different three-dimensional layering or twirling effects to a selected region based on various preferences.

Additional detail regarding the image object ordering system will now be provided with reference to the figures. For example, FIG. 1 illustrates a schematic diagram of an exemplary system 100 in which an image object ordering system 102 operates. As illustrated in FIG. 1, the system 100 includes a server(s) 106, a network 108, and a client device 110. Although the system 100 of FIG. 1 is depicted as having a particular number of components, the system 100 is capable of having any number of additional or alternative components (e.g., any number of servers, client devices, or other components in communication with the image object ordering system 102 via the network 108). Similarly, although FIG. 1 illustrates a particular arrangement of the server(s) 106, the network 108, and the client device 110, various additional arrangements are possible.

The server(s) 106, the network 108, and the client device 110 are communicatively coupled with each other either directly or indirectly (e.g., through the network 108 discussed in greater detail below in relation to FIG. 8). Moreover, the server(s) 106 and the client device 110 include one or more of a variety of computing devices (including one or more computing devices as discussed in greater detail with relation to FIG. 8).

As mentioned above, the system 100 includes the server(s) 106. In one or more embodiments, the server(s) 106 generates, stores, receives, and/or transmits data including notifications, models, and digital images. In one or more embodiments, the server(s) 106 comprises a data server. In some implementations, the server(s) 106 comprises a communication server or a web-hosting server. Further, the server(s) 106 includes a digital design system 104 which further includes the image object ordering system 102.

In one or more embodiments, the client device 110 includes computing devices that access, edit, segment, modify, store, and/or provide, for display, digital content such as digital images. For example, the client device 110 include smartphones, tablets, desktop computers, laptop computers, head-mounted-display devices, or other electronic devices. The client device 110 includes one or more applications (e.g., a digital design editing application 112) that access, edit, segment, modify, store, and/or provide, for display, digital content such as digital images. For example, in one or more embodiments, the digital design editing application 112 includes a software application installed on the client device 110. Additionally, or alternatively, the digital design editing application 112 includes a software application hosted on the server(s) 106 which are accessible by the client device 110 through another application, such as a web browser.

To provide an example implementation, in some embodiments, the image object ordering system 102 on the server(s) 106 supports the image object ordering system 102 on the client device 110. For instance, in some cases, the image object ordering system 102 on the server(s) 106 gathers data. The image object ordering system 102 then, via the server(s) 106, provides the data to the client device 110. In other words, the client device 110 obtains (e.g., downloads) the image object ordering system 102 from the server(s) 106. Once downloaded, the image object ordering system 102 on the client device 110 generates modified digital images by modifying a rendering order.

In alternative implementations, the image object ordering system 102 includes a web hosting application that allows the client device 110 to interact with content and services hosted on the server(s) 106. To illustrate, in one or more implementations, the client device 110 accesses a software application supported by the server(s) 106. In response, the image object ordering system 102 on the server(s) 106 generates and provides a modified digital image. The server(s) 106 then provides the modified digital image to the client device 110 for display.

To illustrate, in some cases, the image object ordering system 102 on the client device 110 determines a selected region (e.g., selected by a user of the digital design editing application 112) via a software application supported by the server(s) 106. The client device 110 transmits the determined selected region to the server(s) 106. In response, the image object ordering system 102 on the server(s) 106 further utilizes the determined selected region to generate one or more object masks, generate one or more vectorized object masks, and determine one or more overlapping regions for modifying a rendering order of portions of objects in the digital image.

Indeed, the image object ordering system 102 is able to be implemented in whole, or in part, by the individual elements of the system 100. Indeed, although FIG. 1 illustrates the image object ordering system 102 implemented with regard to the server(s) 106, different components of the image object ordering system 102 are able to be implemented by a variety of devices within the system 100. For example, one or more (or all) components of the image object ordering system 102 are implemented by a different computing device (e.g., the client device 110) or a separate server from the server(s) 106. Indeed, as shown in FIG. 1, the client device 110 includes the image object ordering system 102. Example components of the image object ordering system 102 will be described below with regard to FIG. 6.

Figure 2:
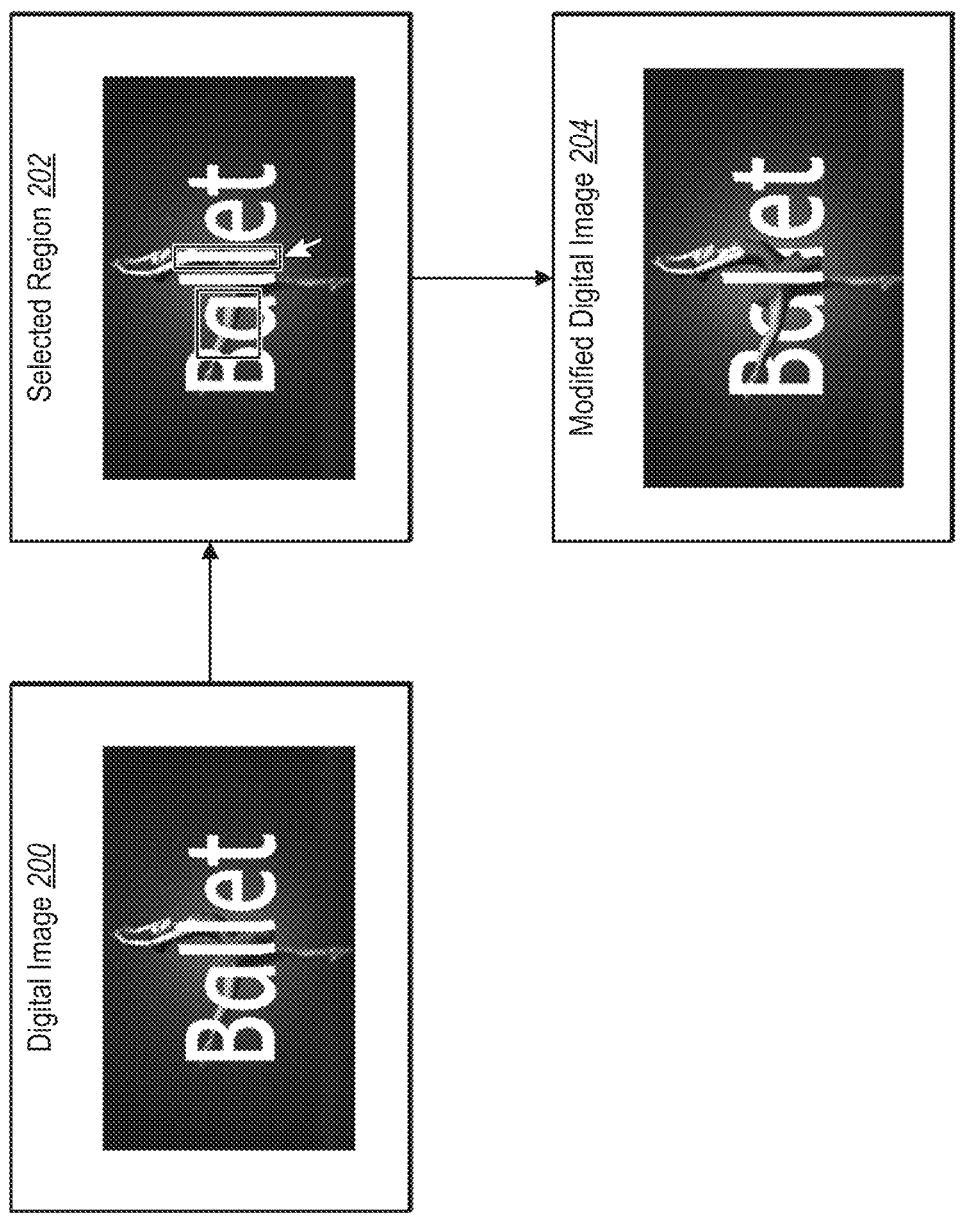
FIG. 2 illustrates an overview diagram of the image object ordering system generating a modified digital image in accordance with one or more embodiments.

As mentioned above, in certain embodiments, the image object ordering system 102 generates a modified digital image by modifying a rendering order of portions of objects within the digital image. FIG. 2 illustrates an overview of the image object ordering system 102 generating a modified digital image from a digital image in accordance with one or more embodiments. For example, FIG. 2 shows the image object ordering system 102 processing a digital image 200. In particular, the digital image 200 includes a digital file including various pictorial elements. Moreover, the pictorial elements include pixel values or vector objects that define the spatial and visual aspects of the digital image 200 such as text objects, image objects, and/or graphical design elements. Furthermore, in one or more embodiments, the image object ordering system 102 receives the digital image 200 uploaded to (or otherwise imported into) an image editing platform (e.g., the digital design editing application 112).

As also mentioned previously, the image object ordering system 102 receives a selected region. FIG. 2 shows the image object ordering system 102 determining a selected region 202 within the digital image 200. For example, the selected region 202 includes the image object ordering system 102 identifying a region within the digital image 200 based on either a user input or an automatic identification. For instance, for a user input, the image object ordering system 102 provides via the image editing application a tool to indicate the selected region. Specifically, the user input to indicate the selected region 202 includes the image object ordering system 102 detecting, via a graphical user interface tool, an indication of a portion of the digital image 200 (e.g., by a user utilizing the tool to drag a box indicator over a portion of the digital image 200). In some embodiments, the image object ordering system 102 provides an indicator for the user to click (e.g., click and drag or click) on a portion of the digital image 200 or use a painting tool to indicate the selected region 202.

Further, in some embodiments, the image object ordering system 102 performs an automatic identification of the selected region 202. The image object ordering system 102 performs the automatic identification by processing the digital image 200 to determine potential regions a user would select. For instance, the image object ordering system 102 utilizes a selected region machine learning model to determine potential regions and provides the determined potential regions to a user as the selected region(s) or as recommendations of selected regions.

To illustrate, the image object ordering system 102 trains the selected region machine learning model with various digital image samples (e.g., digital image samples containing various types of objects) and corresponding ground truth user selected regions. During training, the image object ordering system 102 utilizes the selected region machine learning model to generate predictions for selected regions, compares the generated predictions to the corresponding ground truth selected regions, and modifies parameters of the selected region machine learning model.

During implementation of the selected region machine learning model, the image object ordering system 102 utilizes a segmentation machine learning model to segment objects within a digital image and passes the segmented objects to the selected region machine learning model. Based on the segmented objects, the selected region machine learning model generates selected region recommendations and provides them to the user of the image editing application. Moreover, the selected region 202 indicates to the image object ordering system 102 to modify a rendering order for portions of objects corresponding to the selected region 202. To illustrate, FIG. 2 shows the selected region 202 as encompassing portions of the "B", "a", and a portion of at least one "l" of "Ballet," as well as one or more portions of the ballerina image object.

Moreover, FIG. 2 shows the image object ordering system 102 generating a modified digital image 204 based on the digital image 200 and the selected region 202. For example, the modified digital image 204 includes one or more changes, alterations, or enhancements performed to or on the digital image 200 (e.g., a digital image file). In particular, the modified digital image 204 includes one or more changes, alterations, or enhancements of a rendering order of objects within the digital image 200.

To illustrate, the modified digital image 204 includes portions of objects rendered in a different order than in the digital image 200 depicting the same objects. For instance, in the digital image 200, a first object is portrayed behind a second object, whereas in the modified digital image 204, the image object ordering system 102 causes a portion of the first object corresponding to the selected region 202 to be portrayed in front of a portion of the second object. Accordingly, the modified digital image 204 includes changes to the pixel values of the digital image 200 by changing the rendering order of the corresponding pixel values. To illustrate, FIG. 2 shows the modified digital image 204 with the portion of the ballerina overlapping with the "B", "A", and the second "L" thus intertwining/twirling the ballerina with the text object(s).

Figure 3:
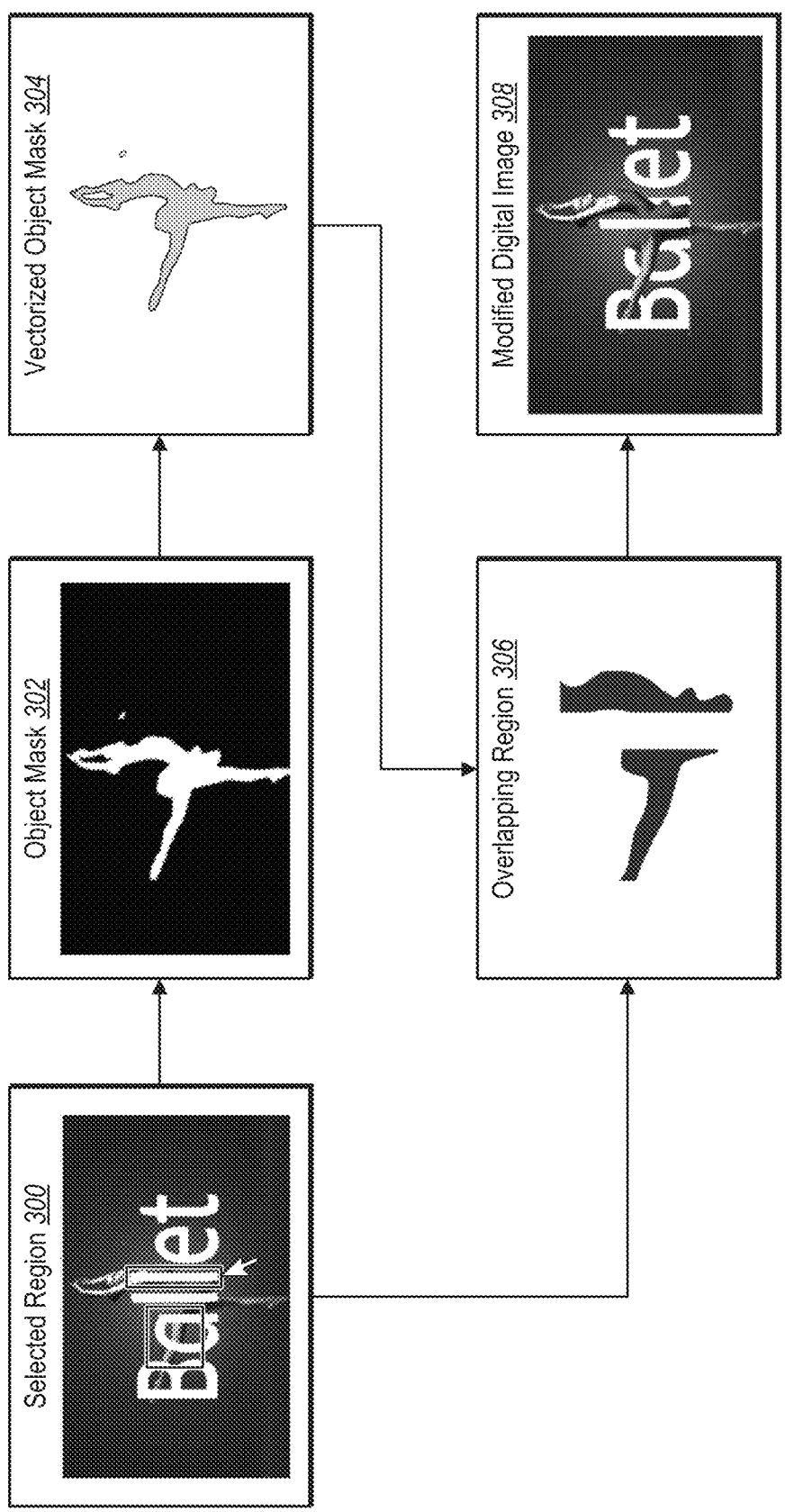
FIG. 3 illustrates a diagram of the image object ordering system utilizing an object mask from an object within a digital image to determine an overlapping region relative to a selected region and generate a modified digital image in accordance with one or more embodiments.

As mentioned above, the image object ordering system 102 determines overlapping regions of objects within a selected region to generate a modified digital image with a modified rendering order of portions of the objects within a digital image. FIG. 3 illustrates the image object ordering system 102 utilizing object masks to determine overlapping regions of objects within a digital image in accordance with one or more embodiments. For example, and as discussed above, FIG. 3 shows the image object ordering system 102 modifying a digital image in response to determining a selected region 300. In particular, as mentioned above, the image object ordering system 102 receives the selected region 300 via one or more inputs to an image editing application or as an automatic recommendation. In one or more embodiments, the selected region 300 includes more than one selected portion of a digital image, such as in response to two or more inputs drawing separate boxes around a plurality of regions of the digital image.

In one or more embodiments, the image object ordering system 102 determines an overlapping region that includes a first portion of the vectorized object mask and a second portion of an additional vectorized object mask of a second object. In particular, the image object ordering system 102 determines the overlapping region as an overlap between the first portion and the second portion located at least partially within the selected region.

As further shown, the image object ordering system 102 generates an object mask 302 based on the selected region 300. In particular, the object mask 302 includes segmenting a portion of a digital image. For instance, the image object ordering system 102 generates the object mask 302 by utilizing a segmentation machine learning model to determine pixels corresponding to an object within the selected region 300 (e.g., an image object or a text object depicted within the digital image). Further, in some embodiments, the object mask 302 includes a binary mask that separates pixel values corresponding to the object from other pixel values (e.g., the image object ordering system 102 assigns a 1 for the pixel values corresponding to the object and a 0 for the other pixel values, or vice-versa). To illustrate, the image object ordering system 102 generates the object mask 302 for a first object of the digital image (e.g., the ballerina image object as shown in FIG. 3). In one or more embodiments, the image object ordering system 102 generates the object mask 302 by utilizing the methods described by Jun Hao Liew, Scott Cohen, Brian Price, Long Mai, and Jiashi Feng in "Deep interactive thin object selection," in *Winter Conference on Applications of Computer Vision (WACV)*, 2021 which is incorporated herein by reference in its entirety. In alternative embodiments, the image object ordering system 102 utilizes any segmentation model for detecting distinct objects and/or portions of objects in a digital image. Additionally, although not shown, the image object rendering system 102 generates one or more additional object masks corresponding to one or more additional objects (e.g., text objects) within the selected region 300.

As mentioned, the image object ordering system 102 generates the object mask 302 for an object. For example, an object includes a collection of pixels (or a set of one or more vector paths) in a digital image that depicts a person, place, text, or thing. To illustrate, in some embodiments, an object includes a person, an item, a natural object (e.g., a tree or rock formation) or a structure depicted in a digital image. Furthermore, in some embodiments, an object includes text that depicts a word or a series of words. In some instances, an object refers to a plurality of elements that, collectively, are distinguishable from other elements depicted in a digital image. For example, in some instances, an object includes a collection of buildings that make up a skyline. In some instances, an object more broadly includes a (portion of a) foreground or other element(s) depicted in a digital image as distinguished from a background.

Furthermore, in some embodiments, the object includes either vectorized or rasterized objects, such that a digital image includes a combination of raster objects and vector objects (e.g., raster objects and vector text within a digital image). For example, a rasterized image includes a grid of pixels. In particular, the rasterized image includes a fixed resolution as determined by a number of pixels within the digital image. Moreover, in one or more embodiments a vectorized image includes various mathematical equations to define lines, shapes, and curves. In particular, vectorized images includes resolution-independent images. For instance, scaling up or down the vectorized image does not result in a loss of quality.

As mentioned above, the image object ordering system 102 generates the object mask 302 for the first object, additionally, the image object ordering system 102 also generates additional object masks for various objects shown within the digital image. For example, the image object ordering system 102 also generates an additional object mask for a second object of the digital image. In particular, the image object ordering system 102 generates an additional object mask for the second object located at least partially within the selected region 300 of the digital image. To illustrate, the image object ordering system 102 generates the additional object mask for the text object "L" in "Ballet." In one or more embodiments, the image object ordering system 102 generates a plurality of separate object masks for each letter in "Ballet".

Moreover, in one or more embodiments, the image object ordering system determines object boundaries from object masks of detected objects in a digital image. FIG. 3 shows the image object ordering system 102 generating a vectorized object mask 304 including a boundary of an object from the object mask 302. For example, the vectorized object mask 304 includes a vector image that indicates the location and shape of an object within the digital image. In particular, the vectorized object mask 304 includes a vector of coordinates of an object's contours shown within the digital image to represent one or more boundaries of an object in vector form. For instance, the image object ordering system 102 generates the vectorized object mask 304 for each object mask generated by the image object ordering system 102.

Furthermore, because the image object ordering system 102 utilizes the object mask 302, in one or more implementations the image object ordering system 102 utilizes a vectorization model that quickly and efficiently generates the vectorized object mask 304 from the object mask 302. Moreover, in one or more implementations, the image object ordering system 102 utilizes existing vector information associated with an object, such as text or other vector objects, to generate the vectorized object mask 304.

In one or more embodiments, the image object ordering system 102 generates the vectorized object mask 304 utilizing sub-paths and compound paths. For example, a sub-path includes a path of a vector object with its own attributes. In particular, the sub-path includes attributes such as fill color, stroke color, and stroke width. For instance, a path includes a series of connected points and curves to define a shape and contains one or more sub-paths. Moreover, each sub-path includes a set of metadata that specify how various points are connected to form the path.

In addition, a compound path includes a single shape or object made up of various sub-paths. In particular, a single object includes one or more sub-paths that define a shape of the object, such as by indicating an outer boundary and any inner boundaries of the object. To illustrate, a first sub-path of the object mask 302 corresponds to an outer boundary of the ballerina, and a second sub-path corresponds to an inner boundary corresponding to a hole in the object mask 302 formed by the arms and hands of the ballerina. Accordingly, a compound path combines a plurality of shapes together via the various sub-paths indicating one or more outer boundaries and any inner boundaries of the object. For instance, the image object ordering system 102 utilizes contour values of the object (e.g., the coordinates from the vectorized object mask 304) and a union operation to create a new path that contains all the points from each of the sub-paths to combine the sub-paths into a single object that excludes portions of the object within the holes of the object mask 302.

In one or more embodiments, the image object ordering system 102 refines the vectorized object mask 304 by applying one or more thresholds to filter out one or more portions of the vectorized object mask 304. In particular, the image object ordering system 102 generates the vectorized object mask 304 by removing one or more paths or regions by applying a filter to remove specific values from the vectorized object mask (e.g., 0 values indicating a black portion of a background of the digital image). In some embodiments, the image object ordering system 102 also removes closed paths that form objects with areas that are below a certain threshold (e.g., indicating possible visual image artifacts or small objects that do not form a contour/boundary of a larger object). Moreover, the image object ordering system 102 merges the remaining sub-paths and converts the contours into a compound path. Furthermore, in generating the vectorized object mask 304, the image object ordering system 102 utilizes normalization techniques to arrange the paths to indicate the direction in which points of a path are connected and ordered (e.g., the image object ordering system 102 determines a winding order).

Similar to above in regard to generating an additional object mask, in one or more embodiments, the image object ordering system 102 also generates an additional vectorized object mask for each additional object located within (or within a threshold distance of) a selected region. In particular, the image object ordering system 102 generates the additional vectorized object mask from the additional object mask for a second object. For instance, the image object ordering system 102 generates the additional vectorized object mask for a text object (e.g., one or more text characters in "Ballet") based on the additional object mask(s) for the text object(s) generated from "Ballet".

FIG. 3 further shows the image object ordering system 102 determining an overlapping region 306. For example, FIG. 3 shows the image object ordering system 102 determining the overlapping region 306 based on the selected region 300 and the vectorized object mask 304. In particular, the image object ordering system 102 determines the overlapping region 306 between the vectorized object mask 304 and the selected region 300. For instance, the overlapping region 306 includes a partial overlap or a complete overlap of the vectorized object mask 304 (e.g., the one or more boundaries of the object) and the selected region 300.

In one or more embodiments and as discussed above, the image object ordering system 102 determines a region to isolate (e.g., trim a region) based on the overlapping region 306. In particular, the image object ordering system 102 determines the overlapping region 306 (e.g., the overlap between the vectorized object mask 304 and the selected region 300) and isolates the overlapping region 306 by extracting the pixel values associated with the overlapping region 306. Alternatively, in some embodiments, the image object ordering system 102 determines coordinates of overlapping regions of objects in digital images utilizing metadata of the corresponding vectorized object masks to determine the overlapping region 306. Accordingly, in one or more embodiments, the image object ordering system 102 provides various methods for applying a three-dimensional intertwining effect (e.g., refining the object mask or region indicated by a user) which works in tandem with the adaptability policies described below to generate a realistic, accurate, and high-quality intertwining effect of objects.

As further shown, FIG. 3 illustrates the image object ordering system 102 generating a modified digital image 308 in response to determining the overlapping region 306, which was discussed above. As mentioned above, the image object ordering system 102 generates the modified digital image 308 by modifying a rendering order of a portion of one or more objects of the digital image in response to determining the overlapping region 306. As mentioned, the modified digital image 308 includes a modified rendering order of a first object and one or more additional objects. For example, the rendering order includes a sequence in which objects are processed and displayed on a graphical user interface of an image editing application. In particular, the image object ordering system 102 changes the rendering order of objects that correspond to the selected region 300. Accordingly, the modified digital image 308 as shown in FIG. 3 shows a three-dimensional layering or intertwining/twirling effect of a first object (e.g., a ballerina) with a second object (e.g., characters in one or more text object(s)).

In one or more embodiments, the image object ordering system 102 generates the modified digital image 308 utilizing a third portion of the first object and a fourth portion of the second object. In particular, the image object ordering system 102 modifies a rendering order of a third portion of the first object that corresponds with a first portion of the vectorized object mask and a fourth portion of the second object that corresponds to the second portion of the additional vectorized object mask.

Although FIG. 3 shows the image object ordering system 102 generating the modified digital image 308 with the overlapping region 306, in one or more additional embodiments, the image object ordering system 102 does not isolate (e.g., trim) the overlapping region 306. Rather, the image object ordering system 102 generates a transparent digital image of all the objects within an image (or selected objects) to layer on top of the digital image. In particular, the image object ordering system 102 generates the transparent digital image that contains the object mask 302. Further, the image object ordering system 102 overlays the transparent digital image on top of the digital image and renders the portion of the transparent digital image corresponding with the selected region 300 (e.g., such that the rendered portion of the transparent digital image corresponding to the selected region 300 is not transparent). Moreover, the image object ordering system 102 generates the modified digital image 308 consistent with the digital image for any regions of the digital image not covered by the front object (e.g., the text object(s) in "Ballet") or the object mask (e.g., object mask for the ballerina object). In doing so, the image object ordering system 102 also creates a twirling effect of objects within the digital image.

Moreover, although FIG. 3 shows a plurality of selected regions, in one or more embodiments, the image object ordering system 102 processes a single region or any number of selected regions (e.g., via a plurality of separate selection boxes/regions). In particular, as discussed above, the image object ordering system 102 utilizes the object mask and the vectorized object mask to determine an overlapping region of the vectorized object mask with the multiple selected regions. In doing so, the image object ordering system 102 generates the modified digital image 308 with the twirling effect for all the objects corresponding with the multiple selected regions (e.g., modifies the rendering order for portions of objects corresponding with the multiple selected regions).

Figure 4A:
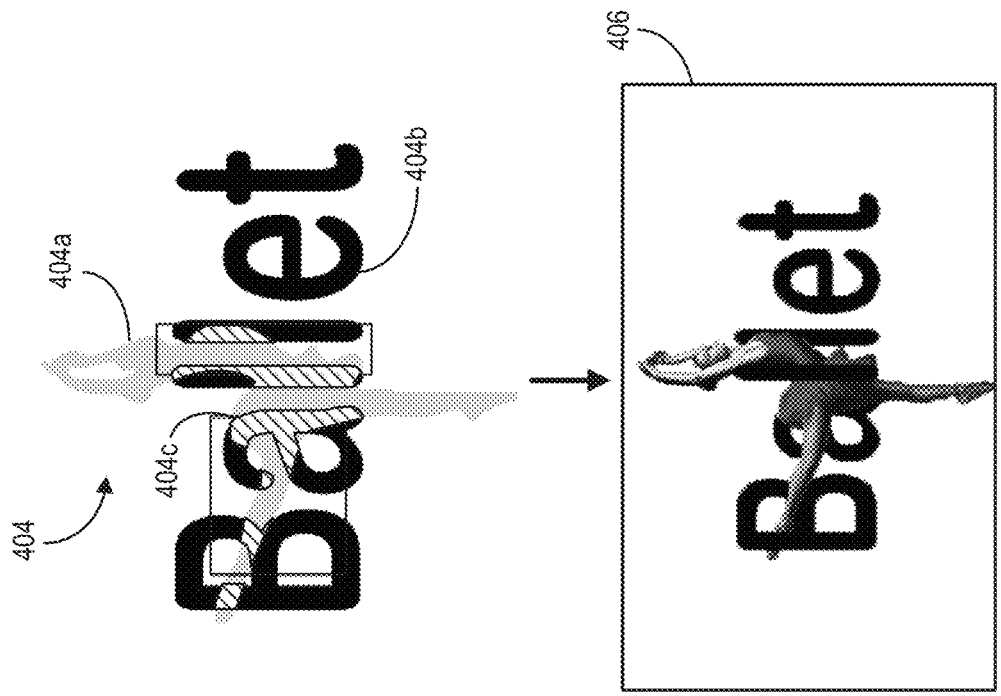
FIG. 4A illustrates examples of the image object ordering system determining object mask intersections of objects in a digital image with one or more selected regions in accordance with one or more embodiments.
Figure 4A:
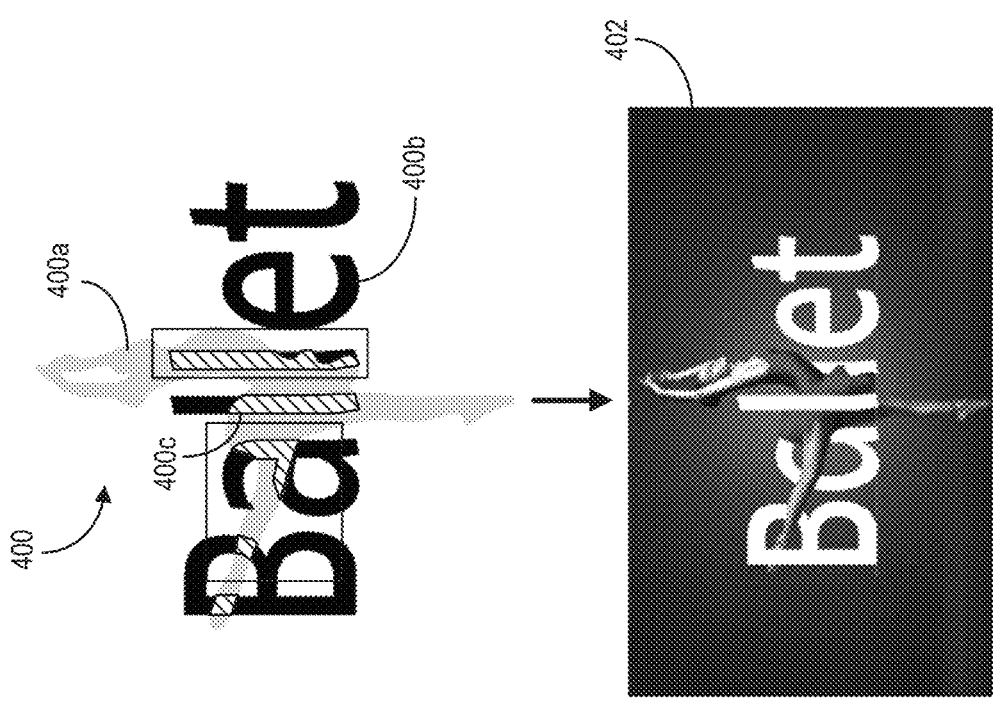

As mentioned above, the image object ordering system 102 determines an overlapping region and utilizes the overlapping region to generate a modified digital image with a modified rendering order of portions of objects. FIG. 4A shows the image object ordering system 102 determining an overlapping region of a first object and a second object (corresponding to a text string) and subsequent results based on the determined overlap in accordance with one or more embodiments. For example, the image object ordering system 102 determines the overlapping region of the first object and the second object by determining object boundaries of the first and second object. In particular, FIG. 4A shows a digital image 400 with an image object 400a (e.g., the first object) and a text object 400b (e.g., the second object).

In one or more embodiments the image object 400a includes a digital representation of a visual or graphical elements. In particular, the image object 400a includes a collection of pixel data or vector data. Further, in some embodiments, the image object 400a includes non-textual objects such as depictions of humans, buildings, cars, or trees. As illustrated, the text object 400b includes a digital representation of a string of text, such as a plurality of sets of paths corresponding to characters in the string of text. In particular, the text object 400b includes a collection of characters, words, and lines of text arranged and formatted according to specific rules and styles. Furthermore, the text object 400b includes various attributes such as font, size, style, color, alignment, and spacing.

To illustrate, in FIG. 4A the digital image 400 shows the image object 400a overlapping with the text object 400b.

Specifically, FIG. 4A indicates the overlapping region between the image object 400a and the text object 400b with hashed lines 400c. For instance, FIG. 4A shows multiple overlapping regions between the image object 400a and the text object 400b. In particular, the image object 400a overlaps with portions of the text object 400b corresponding to the "B", "A", "and second "L" characters. As further shown in FIG. 4A, the overlap between the image object 400a and various letters of the text object 400b includes partial overlaps with one or more of the letters (e.g., each letter that overlaps with the image object 400a in FIG. 4A is a partial overlap).

Furthermore, FIG. 4A shows the image object ordering system 102 generating a modified digital image 402 based on the determined overlapping region (e.g., the hashed lines 400c). For example, FIG. 4A shows the modified digital image 402 as showing a twirling effect. In particular, based on the determined overlapping region, the image object ordering system 102 renders the image object 400a differently in the modified digital image 402 relative to the digital image 400 by changing a rendering order of portions of the image object 400a relative to portions of the text object 400b. Specifically, the modified digital image 402 includes part of the image object 400a in front of a first "l" behind a second "l", in front of part of the "a" and in front of part of the "b" and behind part of the "b".

As shown, the image object ordering system 102 determines whether to render a part of a particular object in front of or behind another object according to an initial rendering order of the objects and a boundary of a selected region. Thus, in some embodiments, changing a display order of one or more of the objects causes the image object ordering system 102 to change the rendering order of the corresponding portions of the objects. In one or more additional embodiments, changing a display order of the one or more objects causes the image object ordering system 102 to reset the twirling effect of the portions of the corresponding object(s).

FIG. 4A also shows an additional digital image 404. As discussed previously, the image object ordering system 102 adapts to changes in object properties. For example, the image object ordering system 102 determines a unified region in response to a modified boundary of the first object or a modified boundary of the second object. In particular, the additional digital image 404 illustrates a modified boundary of a text object as compared to the digital image 400. For instance, the modified boundary in the additional digital image 404 shows a text object modification resulting from a font change and/or a size change.

For example, the additional digital image 404 similarly shows an additional image object 404a and an additional text object 404b including the modified boundary. In particular, the additional digital image 404 shows the additional image object 404a overlapping with the additional text object 404b. Furthermore, FIG. 4A shows the overlapping region between the additional image object 404a and the additional text object 404b as hashed lines 404c. However, in the additional digital image 404 the additional text object 404b includes a font style different from the font style shown in the digital image 400. As shown, due to the differences in font style, the additional digital image 404 shows different overlapping regions with the hashed lines 404c as compared to the overlapping region of the digital image 400 and the text object 400b.

FIG. 4A shows the image object ordering system 102 adapting the changes in object properties that results in modifying the overlapping region(s) of the additional digital image 404 and the text object 400b. For example, as mentioned above, because the changing in font style results in changing the overlapping regions between the objects, the image object ordering system 102 automatically adjusts the rendering order that applies the twirling effect to the objects to account for the changes in the overlapping regions. Thus, the image object ordering system 102 adapts to changes in object properties to update the logical intertwining of the first object and the second object in real-time and provides an updated digital image for display to a user of an image editing application. For instance, the image object ordering system 102 automatically determines logically connected portions of objects (e.g., even if some parts are located outside a previously selected region) to modify object ordering in response to changes to object properties.

Accordingly, FIG. 4A shows the adaptability of the image object ordering system 102 in maintaining a twirling effect of objects within a digital image. Specifically, FIG. 4A illustrates that the image object ordering system 102 automatically adapts to changes to object properties such as font and size. For instance, although the overlapping regions of the digital image 400 varies from the additional digital image 404, the image object ordering system 102 adapts the ballerina image object to intertwine with the text object in the additional modified digital image 406 without displaying ordering artifacts resulting from changes in the object boundaries.

As just discussed, object property modifications include text object modifications. In one or more embodiments, text object modifications include text size. For example, text size includes height and width of characters within a block of text. In particular, the image object ordering system 102 adjusts the text size by changing the point size of the font which defines the height of the characters. Further, modifications include text style which includes a visual appearance of characters in a block of text such as the font, weight, posture, bold/italics, kerning, and other attributes that can impact the boundary positions, shapes, and sizes of text characters.

Although the discussion above relating to objects involved text objects and image objects, in one or more embodiments, the objects also include graphical design element objects. For example, a graphical design element object includes a line, shape, color, or texture utilized as a visual component within a digital image. In some instances, the graphical design element object includes image objects and/or text objects. Furthermore, although the above discussion related to object modifications for text objects, in one or more embodiments, the image object ordering system 102 also automatically adapts object twirling effects in response to modifications to the image object. In particular, the image object ordering system 102 intelligently adapts to modifications made to the image object such as changing the size of the image object.

Figure 4B:
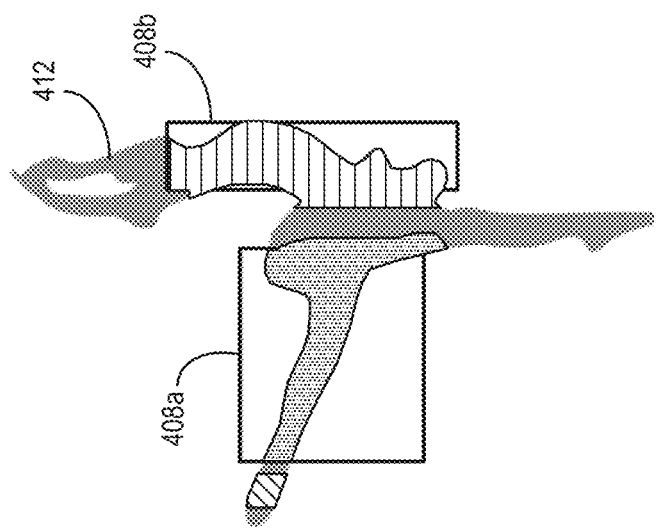
FIG. 4B further illustrates an example of the image object ordering system determining a unified region according to intersections of object masks and selected regions in accordance with one or more embodiments.
Figure 4B:
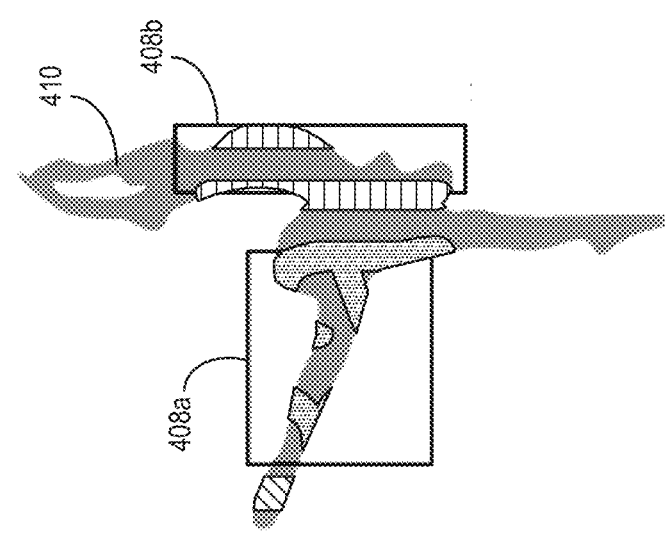
Figure 4B:
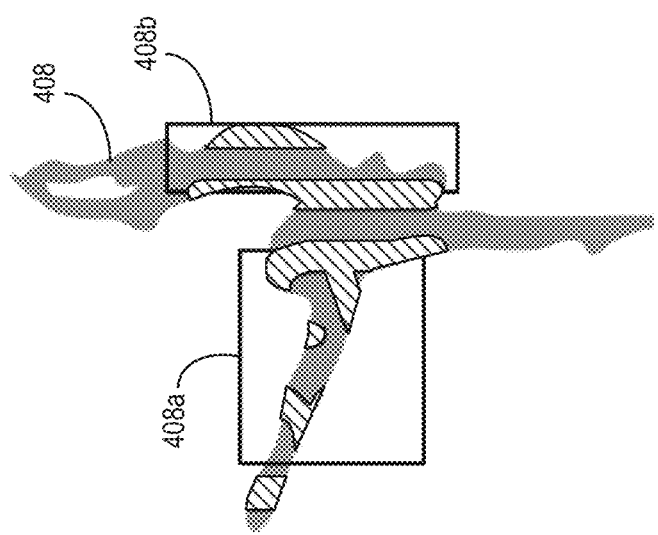

FIG. 4B illustrates the image object ordering system 102 determining a unified region resulting from overlapping regions of objects and a selected region in accordance with one or more embodiments. For example, the image object ordering system 102 determines the unified region in connection with modifying a rendering order of objects. In particular, the unified region corresponds to an intersection of the first object, the second object, and the selected region. Moreover, the unified region includes combining or excluding portions of the determined overlapping region. Further, the unified region establishes an ordered method of intertwining a first object with a second object (e.g., the text object with the image object). Additionally, the image object ordering system 102 also determines/updates the unified region in connection with adapting a twirling effect in response to changes in object properties (e.g., as illustrated in FIG. 4A).

For instance, the image object ordering system 102 determines unified region from the union of each overlapping region between a first object and a second object within the selected region (e.g., a user defined region). To illustrate, FIG. 4B shows an object mask intersection 408 between the image object (e.g., the ballerina) and the text object of FIG. 4A. Specifically, the object mask intersection 408 shows the same hashed pattern to indicate each part of the image object that overlaps with the text object. For example, as illustrated in FIG. 4B, the image object ordering system 102 determines the object mask intersection 408 based on the vectorized object mask (of the first object) and the additional vectorized object mask (of the second object). In particular, as shown in FIG. 4B, the object mask intersection includes the overlap between the text object (e.g., "Ballet") and the image object (e.g., the ballerina image).

Furthermore, FIG. 4B also shows a first selected region 408a and a second selected region 408b. For instance, the first selected region 408a and the second selected region 408b correspond to a plurality of inputs via an image editing application selecting portions of the digital image for generating a modified digital image with a twirling effect of the objects. Accordingly, as illustrated, the first selected region 408a and the second selected region 408b include separately selected portions of the digital image based on separate user inputs to a client device.

Moreover, FIG. 4B further shows an intersection 410 between the object mask intersection and the separate portions of the selected regions. In particular, FIG. 4B shows a first hash pattern in the intersection 410 indicating the intersection 410 corresponding to the object mask intersection and the first selected region 408a. Furthermore, FIG. 4B shows a second hash pattern for the intersection 410 corresponding to the object mask intersection and the second selected region 408b.

Further, FIG. 4B shows a unified region 412. In particular, as illustrated, the image object ordering system 102 determines the unified region 412 to adapt to various changes to object properties and generate the modified digital image. For instance, the image object ordering system 102 utilizes the object mask intersection to determine the unified region from the overlapping region(s) of the selected regions and the corresponding overlapping regions of the objects. Accordingly, as mentioned the unified region includes an intersection between the object mask intersection and the first selected region 408a and the second selected region 408b. Thus, the image object ordering system 102 utilizes the unified region 412 to modify the rendering order of a digital image and to further adapt to any modifications made to object properties.

Figure 4C:
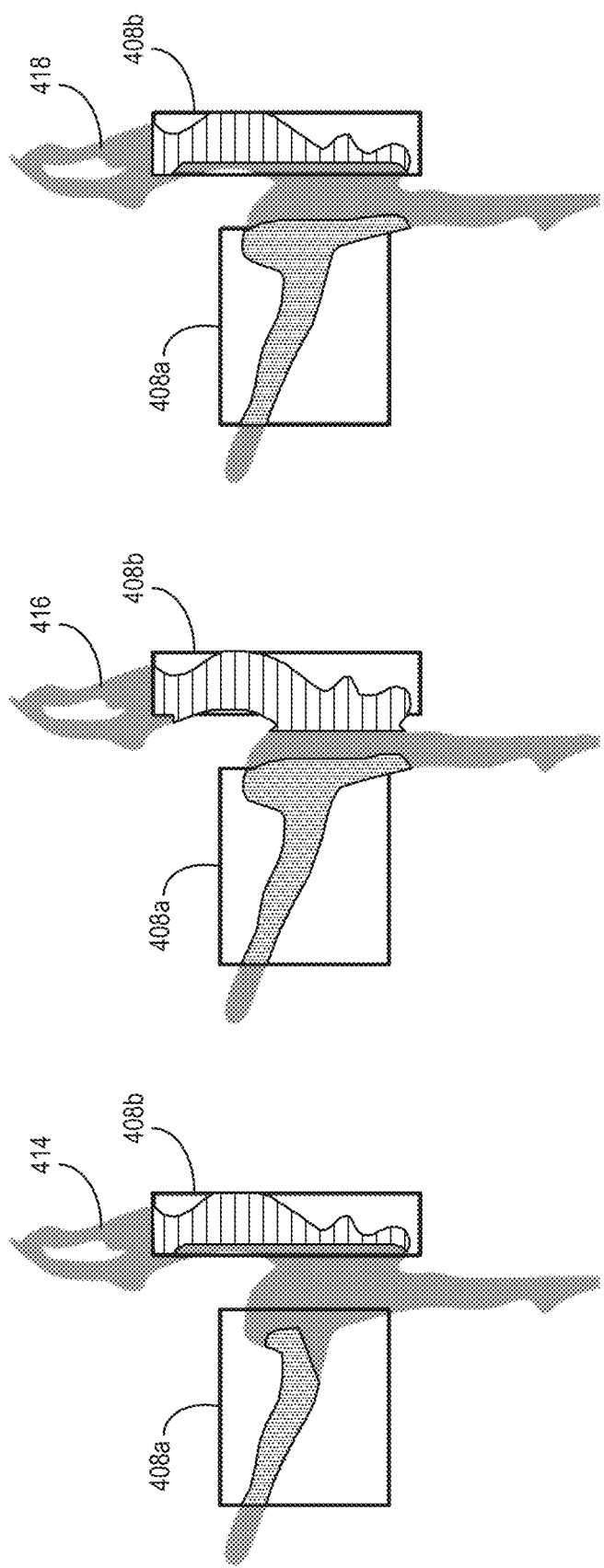
FIG. 4C illustrates an example of the image object ordering system applying various adaptability policies to determine a unified region in accordance with one or more embodiments.

FIG. 4C shows various adaptability policies that the image object ordering system 102 utilizes to determine the unified region in accordance with one or more embodiments. The image object ordering system 102 utilizes a unified region to adapt to changes made to object properties within a digital image (e.g., for an accurate, high-quality, and consistent adaptation). As discussed, the image object ordering system 102 generates the unified region by determining an overlap of two or more objects and utilizing the overlap of the objects to determine an intersection with the selected region. The image object ordering system 102 utilizes an adaptability policy to determine which overlapping regions of two or more objects and a selected region to include in a unified region when at least part of the overlapping regions is located at a boundary of the selected region (e.g., partially within and partially outside the selected region).

For example, FIG. 4C shows a first visualization of a first adaptability policy 414 that indicates a minimum fit policy for excluding one or more overlapping regions that lie inside and outside a selected region. To illustrate, the image object ordering system 102 determines that a partial planar face lies partially within the first selected region 408a and partially outside the first selected region 408a to determine the unified region (and similarly with the second selected region 408b). In other words, the first visualization of the first adaptability policy 414 excludes part of the object mask intersection that corresponds to an overlapping region located at least partially inside and outside the selected region (e.g., corresponding to the overlapping region with the letter "a" in "Ballet"). With reference to FIG. 4B, for example, the object mask intersection 408 includes portions of the object mask intersection not within the first selected region 408a and not within the second selected region 408b. In connection with the first adaptability policy, as shown in FIG. 4C, the image object ordering system 102 utilizes only the object mask intersection that lies within the first selected region 408a and the second selected region 408b to determine the unified region. Accordingly, the first adaptability policy minimally fits the object mask intersection within the selected region(s).

Further, FIG. 4C shows a second visualization of a second adaptability policy 416 that indicates a maximum fit policy for including one or more overlapping regions that lie inside and outside a selected region. To illustrate, the image object ordering system 102 determines each partial planar face that lies partially within the first selected region 408a inside and partially outside the first selected region 408a to determine the unified region (and similarly with the second selected region 408b). In other words, the second visualization of the second adaptability policy 416 includes within the unified region an entire object boundary intersection that lies at least partially within the selected region(s). As mentioned above, FIG. 4B, shows portions of the object mask intersection not within the first selected region 408a and not within the second selected region 408b. In contrast to the first adaptability policy, the second adaptability policy maximally includes the entire object mask intersection even if part of the object mask intersection lies outside of the selected region(s).

Moreover, FIG. 4C shows a third visualization of a third adaptability policy 418. For example, the image object ordering system 102 determines the third adaptability policy by determining a ratio of an area excluded to an area included within a given selected region. The image object ordering system 102 utilizes the determined ratio to further determine the unified region for a selected region. In particular, the image object ordering system 102 determines the ratio by determining an area of a part of the object boundary intersection that lies outside the selected region as compared to an area of a part of the object boundary intersection that lies inside the selected region.

In one or more embodiments, the image object ordering system 102 utilizes a minimum fit policy based on the determined ratio not meeting a threshold value. In particular, the image object ordering system 102 utilizes the first adaptability policy in response to determining that the ratio includes an area of the part of the object boundary intersection that lies outside the selected region which is greater than an area of the part of the object boundary intersection that lies inside the selected region. In other words, the image object ordering system 102 excludes from the unified region a part of the object boundary intersection that lies outside the selected region in response to determining a greater area for the area excluded from the selected region as compared to the area included within the selected region.

On the other hand, the image object ordering system 102 utilizes the maximum fit policy based on the determined ratio meeting the threshold value. In particular, the image object ordering system 102 utilizes the second adaptability policy in response to determining that the ratio includes an area of the part of the object boundary intersection that lies inside the selected region which is greater than an area of the part of the object boundary intersection that lies outside the selected region. In other words, the image object ordering system 102 includes within the unified region an entire object boundary intersection that lies at least partially within the selected region in response to determining a greater area for the area included within the selected region as compared to the area excluded from the selected region.

Moreover, in one or more embodiments, the image object ordering system 102 utilizes a predetermined threshold relationship for the ratio between the area that lies inside the selected region versus the area that lies outside the selected region. In particular, in one or more embodiments, the image object ordering system 102 determines whether the ratio of the area excluded to the area included is greater than 1. Further, if the ratio is greater than 1, the image object ordering system 102 utilizes the first adaptability policy (e.g., minimum fit). However, if the ratio is less than 1, then the image object ordering system 102 utilizes the second adaptability policy (e.g., maximum fit).

As shown in FIG. 4C, the image object ordering system 102 utilizes both the first adaptability policy and the second adaptability policy as part of the third adaptability policy 418 (as illustrated by the third visualization) to determine the unified region. Specifically, utilizing the principles discussed above, the image object ordering system 102 determines for the first selected region 408a of the third adaptability policy 418 in FIG. 4C that the ratio of the area excluded to the area included. In looking to the object mask intersection 408, FIG. 4B shows that the area excluded is less than the area included (e.g., the ratio is <1 or less than a predetermined threshold). As such, for the first selected region 408a, the image object ordering system 102 utilizes the second adaptability policy 416 (e.g., maximum fit). As an example, the image object ordering system 102 determines to include a portion of an object mask intersection outside the boundary of the first selected region 408a (e.g., corresponding to the "a" in "Ballet").

Furthermore, FIG. 4C shows the image object ordering system 102 utilizing the first adaptability policy 414 for the second selected region 408b of the third adaptability policy 418. In particular, in looking to the second selected region 408b in FIG. 4B, the object mask intersection 408 shows the area excluded is greater than the area included (e.g., the ratio is >1). As such, FIG. 4C shows for the second selected region 408b, the image object ordering system 102 utilizes the first adaptability policy 414 (e.g., minimum fit). As an example, the image object ordering system 102 determines to exclude a portion of an object mask intersection outside the boundary of the second selected region 408b (e.g., corresponding to the first "l" in "Ballet").

Accordingly, FIG. 4C shows the image object ordering system 102 determining various unified regions utilizing various adaptability policies. Moreover, the image object ordering system 102 utilizes the unified region to automatically and quickly (e.g., in real-time) adapt to changes in object properties. Based on the various unified regions shown in FIG. 4C, the image object ordering system 102 generates a modified digital image with different twirling effects of objects (e.g., of text objects with image objects). To illustrate, if the image object ordering system 102 utilizes the third adaptability policy 418, the image object ordering system 102 renders the "a" in "Ballet" after a portion of the image object renders while rendering the "l" prior to the portion of the unified region of the image object.

Although FIGS. 4A-4C illustrates a digital image with two objects, in one or more embodiments, the image object ordering system 102 generates a modified digital image with a modified rendering order for more than two objects. In particular, if the digital image contains more than two objects corresponding to a selected region, the image object ordering system 102 similarly generates an object mask for the objects corresponding to the selected region, vectorizes the object masks, and determines and overlapping region of the multiple objects to generate the modified digital image.

Figure 5:
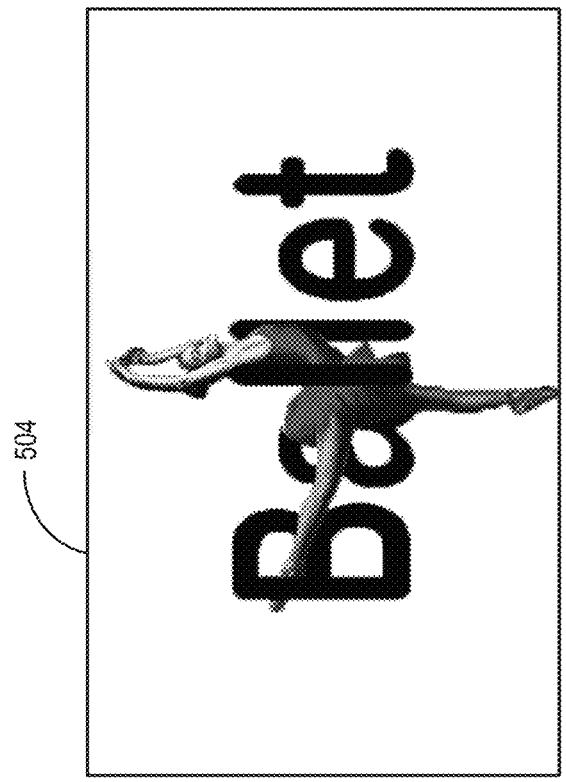
FIG. 5 illustrates an additional example of the image object ordering system generating a modified digital image via object ordering in accordance with one or more embodiments.
Figure 5:
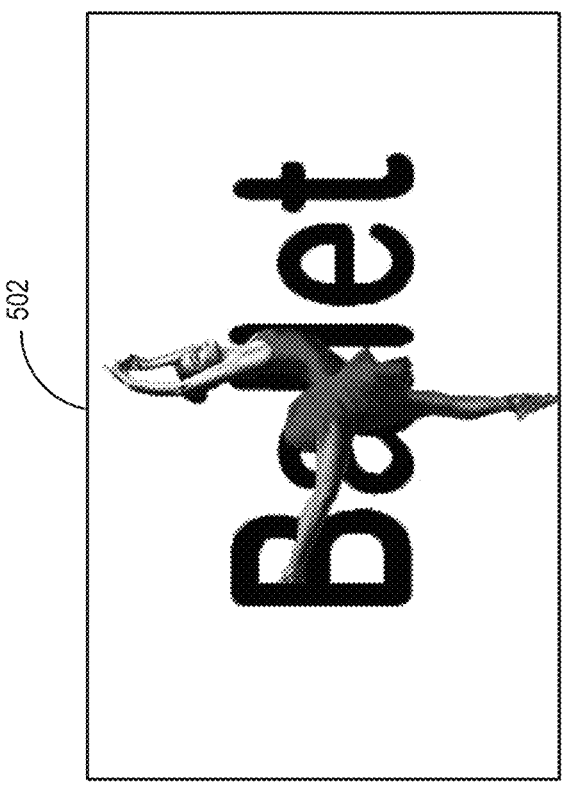

FIG. 5 illustrates an additional examples of the image object ordering system 102 generating modified digital images in accordance with one or more embodiments. For example, FIG. 5 shows a plurality of modified digital images (e.g., a first modified digital image 502 and a second modified digital image 504) resulting from different selected regions of a digital image. As illustrated, the image object ordering system 102 generates the first modified digital image 502 in response to a single selected region (e.g., a single rectangle including a portion of the "B", the "a", and the two "l" characters in "Ballet"). Alternatively, the image object ordering system 102 generates the second modified digital image 504 in response to a plurality of selected regions (e.g., a first rectangle including a portion of the "B" and the "a", and a second rectangle including the second "l" in "Ballet"). Accordingly, the image object ordering system 102 generates different modified digital image with portions of objects intertwined differently depending on the selected regions indicated by the inputs.

Figure 6:
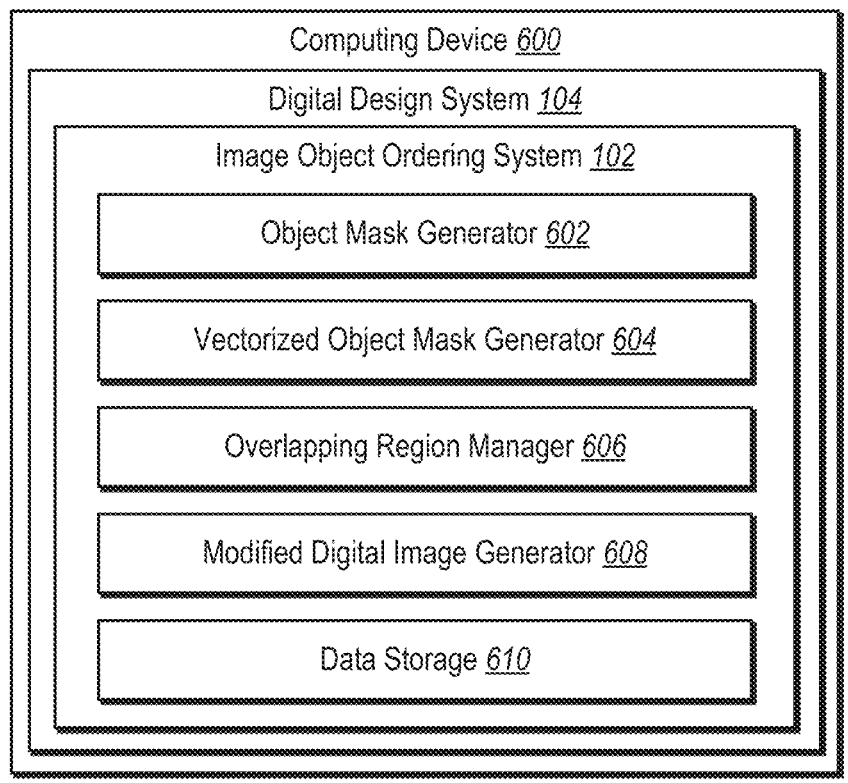
FIG. 6 illustrates an example schematic diagram of the image object ordering system in accordance with one or more embodiments.

Turning to FIG. 6, additional detail will now be provided regarding various components and capabilities of the image object ordering system 102. In particular, FIG. 6 illustrates an example schematic diagram of a computing device 600 (e.g., the server(s) 106 and/or the client device 110) implementing the image object ordering system 102 in accordance with one or more embodiments of the present disclosure for components 602-610. As illustrated in FIG. 6, the image object ordering system 102 includes an object mask generator 602, a vectorized object mask generator 604, an overlapping region manager 606, a modified digital image generator 608, and a data storage 610.

The object mask generator 602 processes a digital image received from the image object ordering system 102. For example, the object mask generator 602 processes a digital image utilizing a segmentation model to extract various objects within a digital image. In particular, the object mask generator 602 determines objects at least partially within a selected region of a digital image and generates an object mask for those objects. Furthermore, the object mask generator 602 generates the object mask for the objects and passes the object mask(s) to the vectorized object mask generator 604.

The vectorized object mask generator 604 receives the object mask(s) from the object mask generator 602. For example, the vectorized object mask generator 604 vectorizes the received object mask(s) to delineate the boundary of the objects. In particular, the vectorized object mask generator 604 generates a boundary of one or more objects within the digital image. Furthermore, the vectorized object mask generator 604 provides the vectorized object mask to overlapping region manager 606. Moreover, the vectorized object mask generator 604 also determines whether to vectorize an object depending on whether the object is a rasterized object or a vectorized object.

The overlapping region manager 606 determines an overlapping region within the digital image. For example, the overlapping region manager 606 determines an overlapping region of the vectorized object mask and the selected region. In particular, the overlapping region manager 606 determines an intersection between objects (e.g., a first object and a second object), and then further determines the intersection between the first object and the second object and the selected region. Moreover, the overlapping region manager 606 also determines a unified region of the overlapping region. The overlapping region manager 606 further assists the image object ordering system 102 in adapting to changes in object properties within the digital image or modified digital image.

The modified digital image generator 608 generates modified digital images. For example, the modified digital image generator 608 generates the modified digital images in response to the overlapping region manager 606 determining an overlapping region. In particular, the modified digital image generator 608 utilizes the overlapping region to determine how to modify a rendering order of the digital image. For instance, the modified digital image generator 608 modifies a rendering order of a portion of a first object within a digital image corresponding to the selected region and a second object of the digital image. To illustrate, the modified digital image generator 608 modifies the rendering order of a portion of an object to be in front of or behind another object in response to determining the overlapping region.

As shown in FIG. 6, the image object ordering system 102 also includes the data storage 610. In particular, the data storage 610 (implemented by one or more memory devices) includes digital images, object masks generated for digital images, trimmed object masks, vectorized object masks, and modified digital images.

Each of the components 602-610 of the image object ordering system 102 can include software, hardware, or both. For example, the components 602-610 can include one or more instructions stored on a computer-readable storage medium and executable by processors of one or more computing devices, such as a client device or server device. When executed by the one or more processors, the computer-executable instructions of the image object ordering system 102 can cause the computing device(s) to perform the methods described herein. Alternatively, the components 602-610 can include hardware, such as a special-purpose processing device to perform a certain function or group of functions. Alternatively, the components 602-610 of the image object ordering system 102 can include a combination of computer-executable instructions and hardware.

Furthermore, the components 602-610 of the image object ordering system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-610 of the image object ordering system 102 may be implemented as a stand-alone application, such as a desktop or mobile application. Furthermore, the components 602-610 of the image object ordering system 102 may be implemented as one or more web-based applications hosted on a remote server. Alternatively, or additionally, the components 602-610 of the image object ordering system 102 may be implemented in a suite of mobile device applications or "apps." For example, in one or more embodiments, the image object ordering system 102 can comprise or operate in connection with digital software applications such as ADOBE® CREATIVE CLOUD®, ADOBE® PHOTOSHOP®, ADOBE® ILLUSTRATOR®, ADOBE® PREMIERE®, ADOBE® INDESIGN®, and/or ADOBE® EXPERIENCE CLOUD®.

Figure 7:
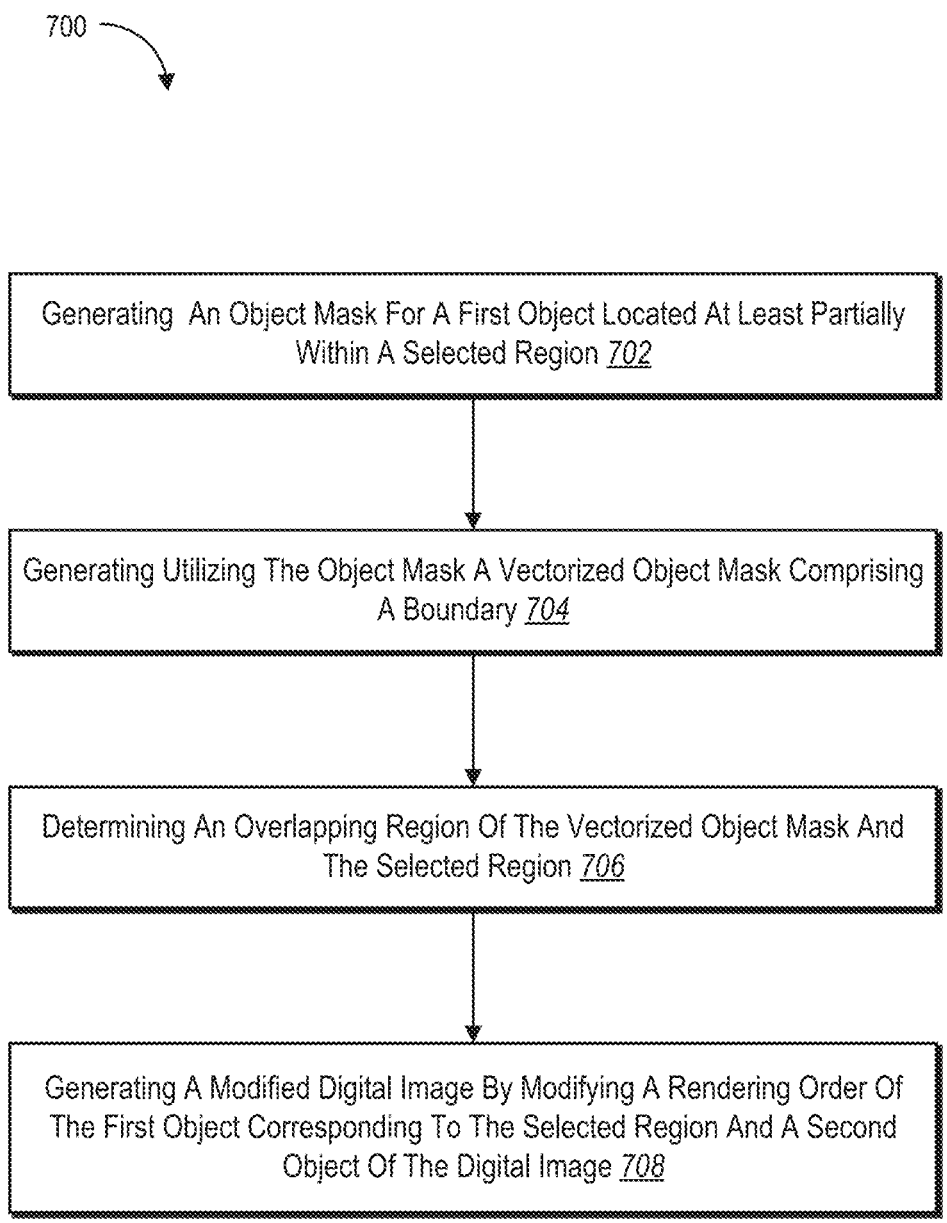
FIG. 7 illustrates a flowchart of a series of acts for adaptive ordering of objects to generate a modified digital image in accordance with one or more embodiments.

FIGS. 1-6, the corresponding text, and the examples provide a number of different methods, systems, devices, and non-transitory computer-readable media of the image object ordering system 102. In addition to the foregoing, one or more embodiments can also be described in terms of flowcharts comprising acts for accomplishing the particular result, as shown in FIG. 7. FIG. 7 may be performed with more or fewer acts. Further, the acts may be performed in different orders. Additionally, the acts described herein may be repeated or performed in parallel with one another or in parallel with different instances of the same or similar acts.

FIG. 7 illustrates a flowchart of a series of acts 700 for generating a modified digital image in accordance with one or more embodiments. FIG. 7 illustrates acts according to one embodiment, alternative embodiments may omit, add to, reorder, and/or modify any of the acts shown in FIG. 7. In some implementations, the acts of FIG. 7 are performed as part of a method. For example, in some embodiments, the acts of FIG. 7 are performed as part of a computer-implemented method. Alternatively, a non-transitory computer-readable medium can store instructions thereon that, when executed by at least one processor, cause a computing device to perform the acts of FIG. 7. In some embodiments, a system performs the acts of FIG. 7. The system further includes at least one server device configured to cause the system to perform the acts of FIG. 7.

The series of acts 700 includes an act 702 of generating an object mask for a first object located at least partially within a selected region, an act 704 of generating utilizing the object mask a vectorized object mask comprising a boundary, an act 706 of determining an overlapping region of the vectorized object mask and the selected region, and an act 708 of generating a modified digital image by modifying a rendering order of the first object corresponding to the selected region and a second object of the digital image.

In particular, the act 702 includes generating, by at least one processing device in response to an input indicating a selected region of a digital image, an object mask for a first object located at least partially within the selected region of the digital image, the act 704 includes generating, by the at least one processing device utilizing the object mask, a vectorized object mask comprising a boundary of the first object, the act 706 includes determining, by the at least one processing device, an overlapping region comprising a first portion of the vectorized object mask overlapping with the selected region and a second portion of an additional vectorized object mask corresponding to a second object located at least partially within the selected region, the act 708 includes generating, by the at least one processing device, a modified digital image by modifying a rendering order of a third portion of the first object corresponding to the first portion of the vectorized object mask and a fourth portion of the second object corresponding to the second portion of the additional vectorized object mask within the selected region of the digital image in response to determining the overlapping region.

In one or more embodiments, the series of acts 700 also includes generating an additional object mask for the second object in response to the second object being located at least partially within the selected region of the digital image and generating, utilizing the additional object mask, the additional vectorized object mask comprising a boundary of the second object. Further, in one or more embodiments, the series of acts 700 includes determining the overlapping region comprises: determining an object mask intersection from the vectorized object mask and the additional vectorized object mask, determining the overlapping region comprising a unified region of the object mask intersection corresponding to an intersection of the object mask intersection and the selected region, and generating the modified digital image comprises utilizing the unified region corresponding to the intersection of the object mask intersection and the selected region to modify the rendering order. Moreover, in one or more embodiments, the series of acts 700 includes determining, from the vectorized object mask, object boundaries of the first object and determining, from the additional vectorized object mask, object boundaries of the second object, wherein at least one of the first object or the second object comprises a text object.

In one or more embodiments, the series of acts 700 also includes determining a unified region corresponding to an intersection of the first object, the second object, and the selected region in response to a modified boundary of the first object or a modified boundary of the second object and generating an additional modified digital image by updating a rendering order of the third portion of the first object corresponding to the first portion of the vectorized object mask and a fourth portion of the second object corresponding to the second portion of the additional vectorized object mask within the selected region according to the unified region. Further, in one or more embodiments, the series of acts 700 includes determining that the modified boundary of the first object or the modified boundary of the second object comprises a modification of a text size of the text object, a text style of the text object, or a font of the text object. Moreover, in one or more embodiments, the series of acts 700 includes determining a plurality of sub-paths of the first object and combining the plurality of sub-paths of the first object into the compound path representing the plurality of sub-paths of the first object as a single vector element. In one or more embodiments, the series of acts 700 includes rendering the third portion of the first object corresponding to the first portion of the vectorized object mask within the selected region in front of the fourth portion of the second object corresponding to the second portion of the additional vectorized object mask within the selected region.

Further, in one or more embodiments, the series of acts 700 includes in response to an input indicating a selected region of a digital image: generating a first object mask for a first object located at least partially within the selected region of the digital image, generating a second object mask for a second object located at least partially within the selected region of the digital image, determining a first object boundary of the first object and a second object boundary of the second object utilizing the first object mask of the first object and the second object mask of the second object, determining one or more overlapping regions comprising a first portion of the first object boundary of the first object overlapping with the selected region and a second portion of the second object boundary of the second object located at least partially within the selected region, and generating a modified digital image by modifying a rendering order of the third portion of the first object corresponding to the first portion of the first object boundary and the fourth portion of the second object corresponding to the second portion of the second object boundary within the selected region of the digital image in response to determining the one or more overlapping regions.

Moreover, in one or more embodiments, the series of acts 700 includes determining the one or more overlapping regions comprises determining an overlapping region comprising a unified region of an object boundary intersection of the first object and the second object corresponding to an intersection of the object boundary intersection and the selected region and generating the modified digital image comprises utilizing the unified region corresponding to the intersection of the object boundary intersection and the selected region to modify the rendering order.

In one or more embodiments, the series of acts 700 also includes excluding from the unified region a part of the object boundary intersection that lies outside the selected region. Further, in one or more embodiments, the series of acts 700 includes including within the unified region an entire object boundary intersection that lies at least partially within the selected region. Moreover, in one or more embodiments, the series of acts 700 includes determining the unified region according to a ratio determined from an area of a first part of the object boundary intersection that lies outside the selected region as compared to an area of a second part of the object boundary intersection that lies inside the selected region. In one or more embodiments, the series of acts 700 includes excluding from the unified region the first part of the object boundary intersection that lies outside the selected region in response to determining that the ratio is greater than a threshold. Further, in one or more embodiments, the series of acts 700 includes including within the unified region an entire object boundary intersection that lies at least partially within the selected region in response to determining that the ratio is less than a threshold.

Further, in one or more embodiments, the series of acts 700 includes generating an additional object mask for the second object in response to the second object being located at least partially within the selected region of the digital image, generating the additional vectorized object mask comprising a boundary of the second object, and determining an object mask intersection from the vectorized object mask and the additional vectorized object mask. Moreover, in one or more embodiments, the series of acts 700 includes determining the overlapping region comprises determining a unified region of the object mask intersection corresponding to an intersection of the object mask intersection and the selected region, and generating the modified digital image comprises utilizing the unified region corresponding to the intersection of the object mask intersection and the selected region to modify the rendering order. Additionally, in one or more embodiments, the series of acts 700 includes determining a plurality of overlapping regions of the vectorized object mask and a plurality of selected regions.

Further, in one or more embodiments, the series of acts 700 includes rendering the third portion of the first object corresponding to the first portion of the vectorized object mask within the selected region in front of the fourth portion of the second object corresponding to the second portion of the additional vectorized object mask within the selected region. Moreover, in one or more embodiments, the series of acts 700 includes rendering the third portion of the first object corresponding to the first portion of the vectorized object mask within the selected region behind the fourth portion of the second object corresponding to the second portion of the additional vectorized object mask within the selected region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
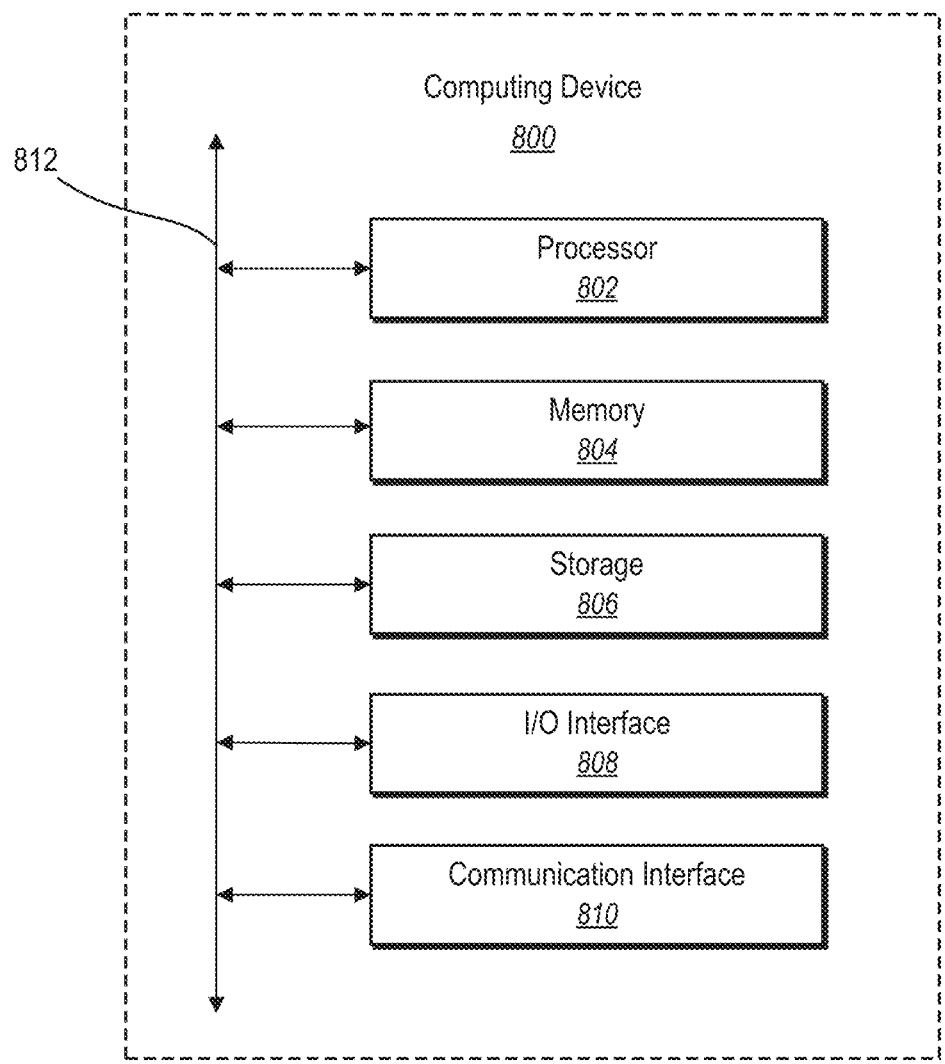
FIG. 8 illustrates a block diagram of an exemplary computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 106 and/or the client device 110). In one or more embodiments, the computing device 800 may be a mobile device (e.g., a mobile telephone, a smartphone, a PDA, a tablet, a laptop, a camera, a tracker, a watch, a wearable device). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 including storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, by at least one processing device in response to an input indicating a selected region of a digital image, an object mask for a first object located at least partially within the selected region of the digital image;
generating, by the at least one processing device utilizing the object mask, a vectorized object mask comprising a boundary of the first object;
determining, by the at least one processing device, an overlapping region comprising a first portion of the vectorized object mask overlapping with the selected region and a second portion of an additional vectorized object mask corresponding to a second object located at least partially within the selected region; and
generating, by the at least one processing device, a modified digital image by modifying a rendering order of a third portion of the first object corresponding to the first portion of the vectorized object mask and a fourth portion of the second object corresponding to the second portion of the additional vectorized object mask within the selected region of the digital image in response to determining the overlapping region.

2. The method of claim 1, further comprising:
generating an additional object mask for the second object in response to the second object being located at least partially within the selected region of the digital image; and
generating, utilizing the additional object mask, the additional vectorized object mask comprising a boundary of the second object.

3. The method of claim 2, wherein:
determining the overlapping region comprises:
determining an object mask intersection from the vectorized object mask and the additional vectorized object mask; and
determining the overlapping region comprising a unified region of the object mask intersection corresponding to an intersection of the object mask intersection and the selected region; and
generating the modified digital image comprises utilizing the unified region corresponding to the intersection of the object mask intersection and the selected region to modify the rendering order.

4. The method of claim 2, further comprising:
determining, from the vectorized object mask, object boundaries of the first object; and
determining, from the additional vectorized object mask, object boundaries of the second object, wherein at least one of the first object or the second object comprises a text object.

5. The method of claim 4, further comprising:
determining a unified region corresponding to an intersection of the first object, the second object, and the selected region in response to a modified boundary of the first object or a modified boundary of the second object; and
generating an additional modified digital image by updating a rendering order of the third portion of the first object corresponding to the first portion of the vectorized object mask and the fourth portion of the second object corresponding to the second portion of the additional vectorized object mask within the selected region according to the unified region.

6. The method of claim 5, further comprising determining that the modified boundary of the first object or the modified boundary of the second object comprises a modification of a text size of the text object, a text style of the text object, or a font of the text object.

7. The method of claim 1, wherein generating the vectorized object mask further comprises generating a compound path by:
determining a plurality of sub-paths of the first object; and
combining the plurality of sub-paths of the first object into the compound path representing the plurality of sub-paths of the first object as a single vector element.

8. The method of claim 1, wherein generating the modified digital image further comprises rendering the third portion of the first object corresponding to the first portion of the vectorized object mask within the selected region in front of the fourth portion of the second object corresponding to the second portion of the additional vectorized object mask within the selected region.

9. A system comprising:
a memory component; and
one or more processing devices coupled to the memory component, the one or more processing devices to perform operations comprising:
in response to an input indicating a selected region of a digital image:
generating a first object mask for a first object located at least partially within the selected region of the digital image;
generating a second object mask for a second object located at least partially within the selected region of the digital image;
determining a first object boundary of the first object and a second object boundary of the second object utilizing the first object mask of the first object and the second object mask of the second object;

determining one or more overlapping regions comprising a first portion of the first object boundary of the first object overlapping with the selected region and a second portion of the second object boundary of the second object located at least partially within the selected region; and generating a modified digital image by modifying a rendering order of a third portion of the first object corresponding to the first portion of the first object boundary and a fourth portion of the second object corresponding to the second portion of the second object boundary within the selected region of the digital image in response to determining the one or more overlapping regions.

10. The system of claim 9, wherein:

determining the one or more overlapping regions comprises determining an overlapping region comprising a unified region of an object boundary intersection of the first object and the second object corresponding to an intersection of the object boundary intersection and the selected region; and generating the modified digital image comprises utilizing the unified region corresponding to the intersection of the object boundary intersection and the selected region to modify the rendering order.

11. The system of claim 10, wherein determining the overlapping region comprising the unified region further comprises excluding from the unified region a part of the object boundary intersection that lies outside the selected region.

12. The system of claim 10, wherein determining the overlapping region comprising the unified region further comprises including within the unified region an entire object boundary intersection that lies at least partially within the selected region.

13. The system of claim 10, wherein determining the overlapping region comprising the unified region further comprises determining the unified region according to a ratio determined from an area of a first part of the object boundary intersection that lies outside the selected region as compared to an area of a second part of the object boundary intersection that lies inside the selected region.

14. The system of claim 13, wherein the operations further comprise excluding from the unified region the first part of the object boundary intersection that lies outside the selected region in response to determining that the ratio is greater than a threshold.

15. The system of claim 13, wherein the operations further comprise including within the unified region an entire object boundary intersection that lies at least partially within the selected region in response to determining that the ratio is less than a threshold.

16. A non-transitory computer-readable medium storing executable instructions which, when executed by at least one processing device, cause the at least one processing device to perform operations comprising:

generating, by at least one processing device in response to an input indicating a selected region of a digital image, an object mask for a first object located at least partially within the selected region of the digital image;

generating, by the at least one processing device utilizing the object mask, a vectorized object mask comprising a boundary of the first object;

determining, by the at least one processing device, an overlapping region comprising a first portion of the vectorized object mask overlapping with the selected region and a second portion of an additional vectorized object mask corresponding to a second object located at least partially within the selected region; and generating, by the at least one processing device, a modified digital image by modifying a rendering order of a third portion of the first object corresponding to the first portion of the vectorized object mask and a fourth portion of the second object corresponding to the second portion of the additional vectorized object mask within the selected region of the digital image in response to determining the overlapping region.

17. The non-transitory computer-readable medium of claim 16, wherein determining the overlapping region comprises:

generating an additional object mask for the second object in response to the second object being located at least partially within the selected region of the digital image;

generating the additional vectorized object mask comprising a boundary of the second object; and determining an object mask intersection from the vectorized object mask and the additional vectorized object mask.

18. The non-transitory computer-readable medium of claim 17, wherein:

determining the overlapping region comprises determining a unified region of the object mask intersection corresponding to an intersection of the object mask intersection and the selected region; and generating the modified digital image comprises utilizing the unified region corresponding to the intersection of the object mask intersection and the selected region to modify the rendering order.

19. The non-transitory computer-readable medium of claim 16, wherein determining the overlapping region further comprises determining a plurality of overlapping regions of the vectorized object mask and a plurality of selected regions.

20. The non-transitory computer-readable medium of claim 16, wherein generating the modified digital image further comprises:

rendering the third portion of the first object corresponding to the first portion of the vectorized object mask within the selected region in front of the fourth portion of the second object corresponding to the second portion of the additional vectorized object mask within the selected region; or rendering the third portion of the first object corresponding to the first portion of the vectorized object mask within the selected region behind the fourth portion of the second object corresponding to the second portion of the additional vectorized object mask within the selected region.

* * * * *